United States Patent
Drummond-Murray et al.

(10) Patent No.: US 6,594,270 B1
(45) Date of Patent: Jul. 15, 2003

(54) AGEING OF DATA PACKETS USING QUEUE POINTERS

(75) Inventors: Justin A Drummond-Murray, Chorleywood (GB); Robin Parry, Watford (GB); David J Law, Kempston (GB); Paul J Moran, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/353,148

(22) Filed: Jul. 14, 1999

(30) Foreign Application Priority Data

Apr. 21, 1999 (GB) .............................................. 9909026

(51) Int. Cl.[7] .......................... H04L 12/66; H04L 12/42
(52) U.S. Cl. ........................ 370/412; 370/353; 370/354; 370/363; 370/374; 370/383; 370/394; 370/395.62; 370/413; 370/414; 370/415; 370/416; 370/417
(58) Field of Search ................................. 370/455, 353, 370/354, 363, 374, 383, 394, 395.62, 412, 413, 414, 415, 416, 417

(56) References Cited

U.S. PATENT DOCUMENTS 4,654,654 A * 3/1987 Butler ...................... 340/825.5

5,748,627 A 5/1998 Weir

FOREIGN PATENT DOCUMENTS

GB 2325597 A 11/1998

* cited by examiner

Primary Examiner—Kwang Bin Yao
Assistant Examiner—Kamran Emdadi
(74) Attorney, Agent, or Firm—Nixon & Vanderhye P.C.

(57) ABSTRACT

A packet memory system including a memory space having a multiplicity of addressable memory locations for the storage of data packets, pointer control means for generating a write pointer which progressively defines where data is to be written to the memory space and a read pointer which progressively defines where data is to be read from the memory space and an ageing clock which defines a succession of intervals. The pointer control means generates a 'current' pointer and a 'discard' pointer and for each interval is operative to cause the 'current' pointer to correspond to an immediately previous value of the write pointer and to cause the discard pointer to correspond to an immediately previous value of the said current pointer. In this manner the portion of the memory space between the 'discard' pointer and the read pointer denotes data which has been in said memory space for at least two of said intervals. The system thereby defines ageing by means of pointers and avoids the ambiguities or inconvenience of known recycling ageing schemes.

14 Claims, 3 Drawing Sheets

AGEING OF DATA PACKETS USING QUEUE POINTERS

BACKGROUND OF THE INVENTION

1. Field of the Invention

This invention relates to packet-based communication systems wherein data packets are required to form a queue. The invention is applicable but not limited to, network devices such as routers, switches, adapters and suchlike.

2. Description of Related Art

It is well known in most types of packet-based systems to provide some means, for example a FIFO defined in an allotted space in static random access memory, for holding a respective one of a multiplicity of queues of packets. In particular, packet queues may be formed for packets received by a respective port of a network device and packets may be formed into queues before they are transmitted from the respective ports of the device. It is well understood that it is necessary to provide temporary storage in the form of queues so as to take into account the differences in data rates of individual devices and links between devices as well as other considerations such as congestion, contention resolution and so forth. In a specific form of the invention described by way of example hereinafter, queues are formed at the transmit side of a switch prior to transmission across the switch; but queues may be formed in a variety of different contexts and it is not desired to limit the invention to that particular context.

It is customary to define a queue of packets by means of a 'head' or write pointer and a 'tail' or read pointer. As its name suggest, the head pointer defines the start of a queue and normally indicates the position at which new data packets will be written to the queue. The tail pointer indicates the position at which packets will be read from the queue.

It is known to form queues not only in hardware but in static random access memory and also dynamic random access memory or buffer memory wherein, unlike the formation of FIFOs in static random access memory the queue is formed by the allotment of buffers from a free pool to a particular queue under the access of a free pool controller (such as described in British patent 2321820 by way of example). However, in principle the usage of pointers is the same. It is also not important whether the head pointer points to the last location in which data has been written and so indirectly defines the next location in which the writing of a new packet will commence (as may be adopted for FIFOs implemented in SRAM) or actually points to the next free location in a buffer allotted to that memory queue, as is the practice in various forms of dynamic random access memory.

It is customary, when each packet enters the system (for example a network device wherein queues are formed), a packet receives a 'time stamp' to indicate the time of arrival. It is customary that when the packet has been processed the time stamp is compared with the current time to determine whether the packet has aged too much, that is to say has been held for a time which is, arbitrarily, too long. One example of this process is described in EP-A-0594196.

It is customary to define a system time (with which a packet is 'stamped' as it enters the system) by means of a recycling counter. The reason for this is that (as is well known), packets comprise a header portion including address data, such as media access control addresses and/or network addresses, and control data defining the packet type and other attributes, followed by the information or user data and checksum or redundancy code data. The process of stamping constitutes part of the encapsulation or deencapsulation process involving reading and/or writing of header fields and the particular action of stamping requires the writing of data into an allotted field space within the header or control portion of the data packet. Since the age field is necessarily limited, being only a few bits or even a single bit, the artificial system time must recycle. The number of bits in the age field and the recycling period are to a large extent a matter of choice, depending on the nature of the device, the traffic it must bear and the data rate at which it is required to perform.

In any event, there exists a difficulty in recycling ageing schemes, such that if a packet is delayed for an unusual time, the counter may recycle so that over age packets that should be discarded might not be discarded on the basis of a comparison of their entry age with a current system age. This may partly be offset by the employment of a comparatively long recycling period, but then the system tends to have a course granularity, thus to say the individual intervals of age (represented by the least significant bit in an age field) represent what may be an excessive unit of time.

SUMMARY OF THE INVENTION

The invention is based on the use of at least one and preferably two queue pointers to keep track of the age of packets in the queue. These include a pointer, conveniently called a 'discard' pointer which assumes for each ageing interval an earlier value of the head pointer so that the queue between the discard pointer and the read pointer comprises 'over-age' data.

In a particular example, each queue has two ageing pointers, called herein 'current' and 'discard' which are controlled in accordance with the increments of system age such that on each increment the queue head pointer is stored as a current ageing pointer and a valid flag is set whereas a previous value of the current pointer and its flag are stored as the discard pointer. The data held between the discard and the tail pointers thereby indicate all packets that have been in the queue longer than two increments of age and which now may be discarded because they are over age.

Such a process can be made to occur at every ageing increment and accordingly the discard pointer will move up the queue so that even if data cannot be removed from the queue the amount of data which is defined as 'over-age' will simply increase. Because the 'over-age' packets are defined as occurring between the discard pointer and the tail pointer, it is impossible for the stale data to become valid, unlike systems employing a simple comparison between a recycling system age and a stamped value obtained from a previous value of the artificial system age.

The above and further features of the invention will be explained hereinafter with reference to a specific example and with reference to the accompanying drawings.

DETAILED DESCRIPTION OF A SPECIFIC EXAMPLE

Figure 1:
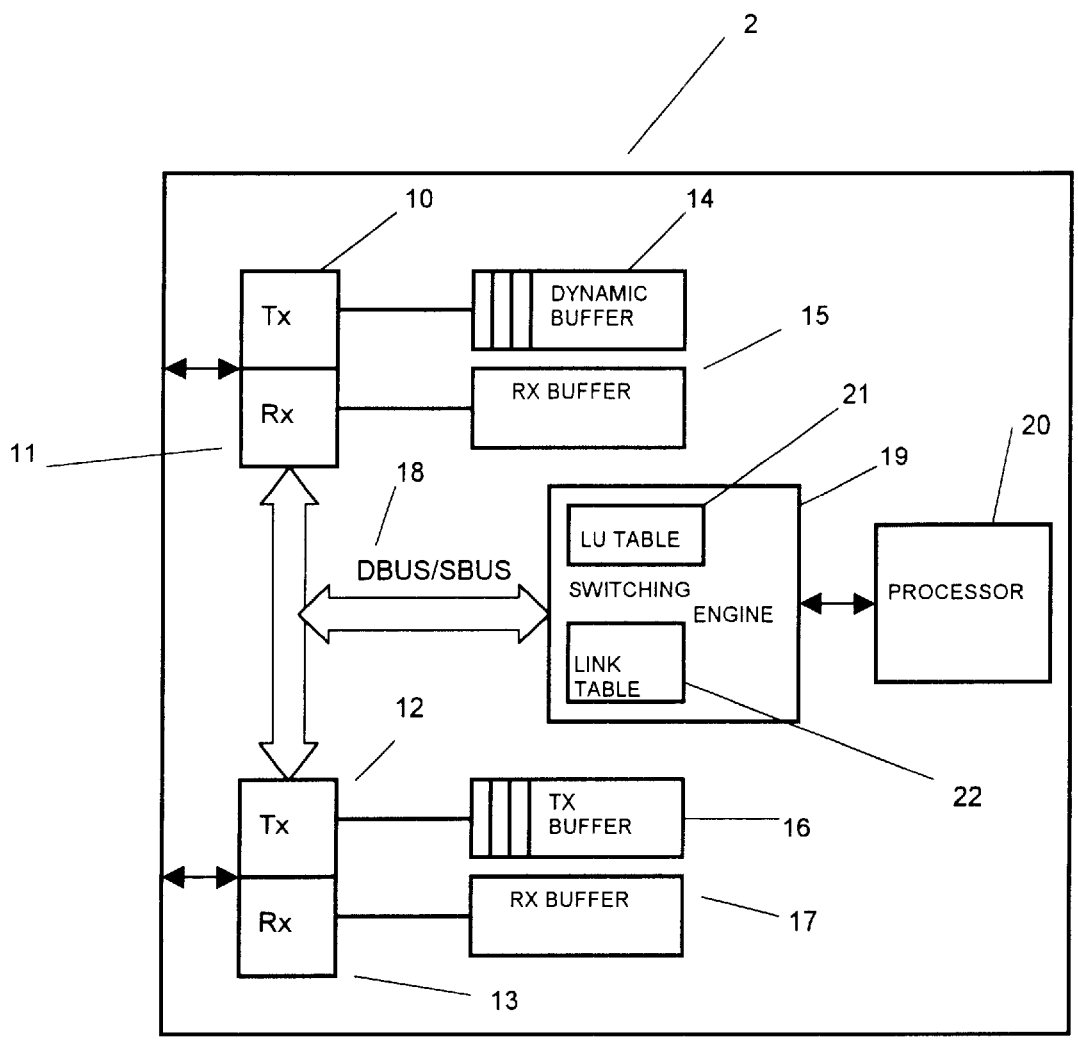
FIG. 1 illustrates part of a typical network device in which queues of packets are formed.

FIG. 1 of the drawings illustrates merely by way of example a switch in which the present invention may be used. This switch is typical of routers, adapters and other network devices in which various queues of packets are performed before those packets are transmitted across the device or from the device.

In the example shown in FIG. 1, a communication link 1 is coupled to one duplex port of a switch 2. Typically a switch of this nature has a large number of ports which are normally duplex ports, capable of both reception and transmission. In this example, a port coupled to link 1 has a transmit function 10 and a receive function 11. Another port has a transmit function 12 and a receive function 13.

In common with switches of this nature, packets received at the receive parts of the ports are stored in respective receive buffers whereas packets ready for transmission by the transmit parts of the ports are stored in transmit buffers respectively. Each of these buffer stores may form a traffic queue. In the example given, the transmit part of the first port has a transmit buffer 14, a receive part 11 of the first port has a receive buffer 15, a transmit part of the second port 12 has a transmit buffer 16 and the receive part of the second port has a receive buffer 17.

When packets are received, for example, by receive port 11, the packets may be stored in receive buffer 15 while header portions of the packets are stripped and conveyed by way of a data and status bus 18 to a switching engine 19. This has a variety of functions, including for example a look-up table 21 which will examine address data in a receive packet to determine with the aid of a link table 22 which port of ports the respective packet should be sent to. The look-up table is normally compiled by an examination of source addresses of receive packets so as to associate port numbers with source addresses. Packets which do not have a destination address matched by a source address in the table may need to be broadcast from at least some of the ports in order to perform the known process of address resolution. Computation necessary for the switching engine is provided by a processor 21, which may serve to provide control or management frames in a variety of circumstances which are not particularly relevant to the present invention.

After the examination of a receive packet determines the port or ports to which the packets should be sent, the packet may be sent in its turn from the receive buffer across the switch by way of bus 18 to the respective transmit buffer of the or each port from which the packet should be forwarded.

It is common in switches of this nature to store the packets in the buffer stores in the form of a status word, defining the size of the packet, the type or priority of the packet and so on, followed by the packet data.

Figure 2:
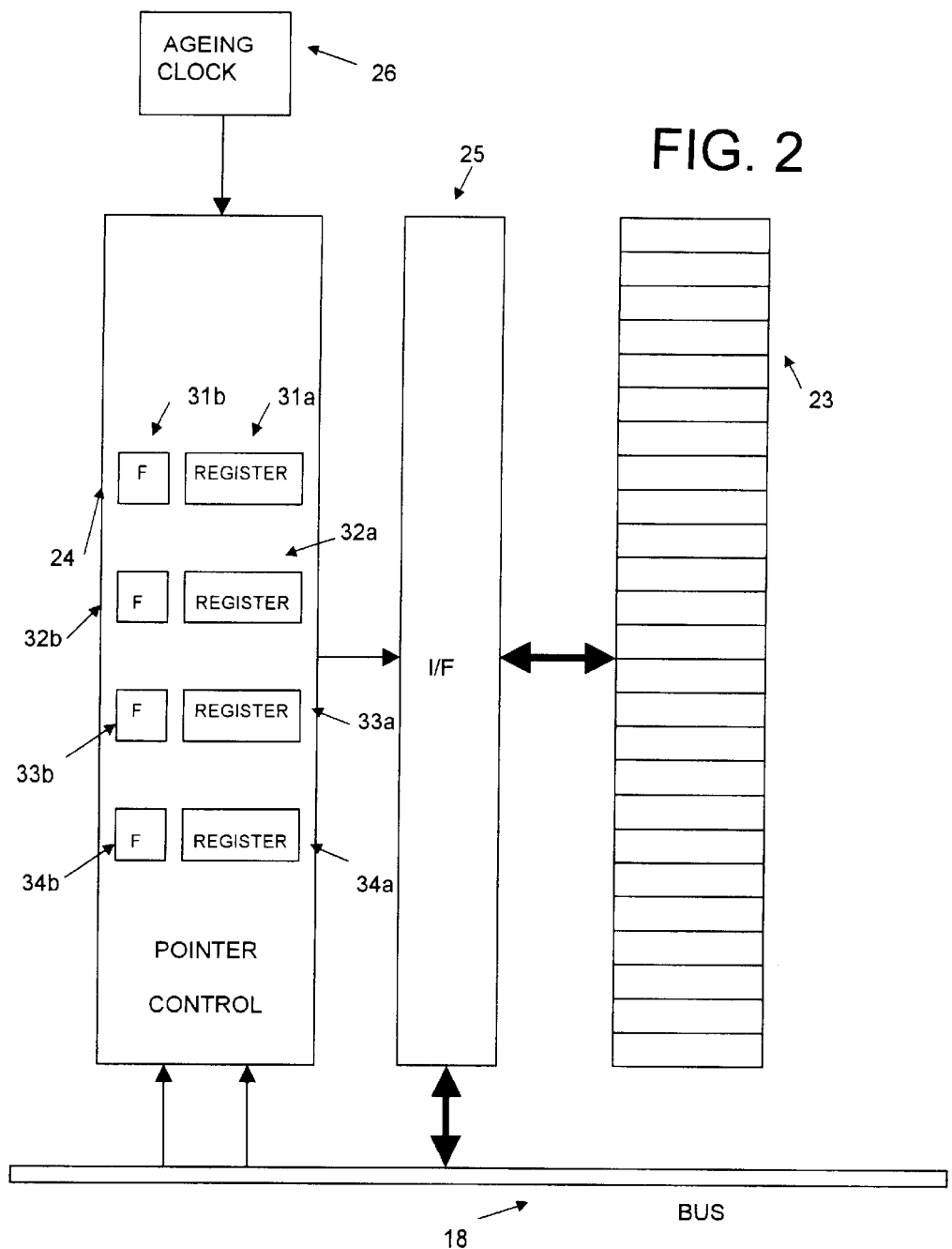
FIG. 2 illustrates the control of a traffic queue by means of pointers.

FIG. 2 illustrates one form of FIFO for forming a queue of packets in a switch of the kind shown in FIG. 1. It is assumed in this example that the memory space 23 is defined in static random access memory and has a multiplicity of addressable locations which can be identified by pointers. Such pointers may be generated by a pointer control 24 and determine the writing and reading of packets into and out of the memory space by means of an interface which responds to the pointers and provides a means of communicating packets from the bus 18 to the memory space.

Figure 3:
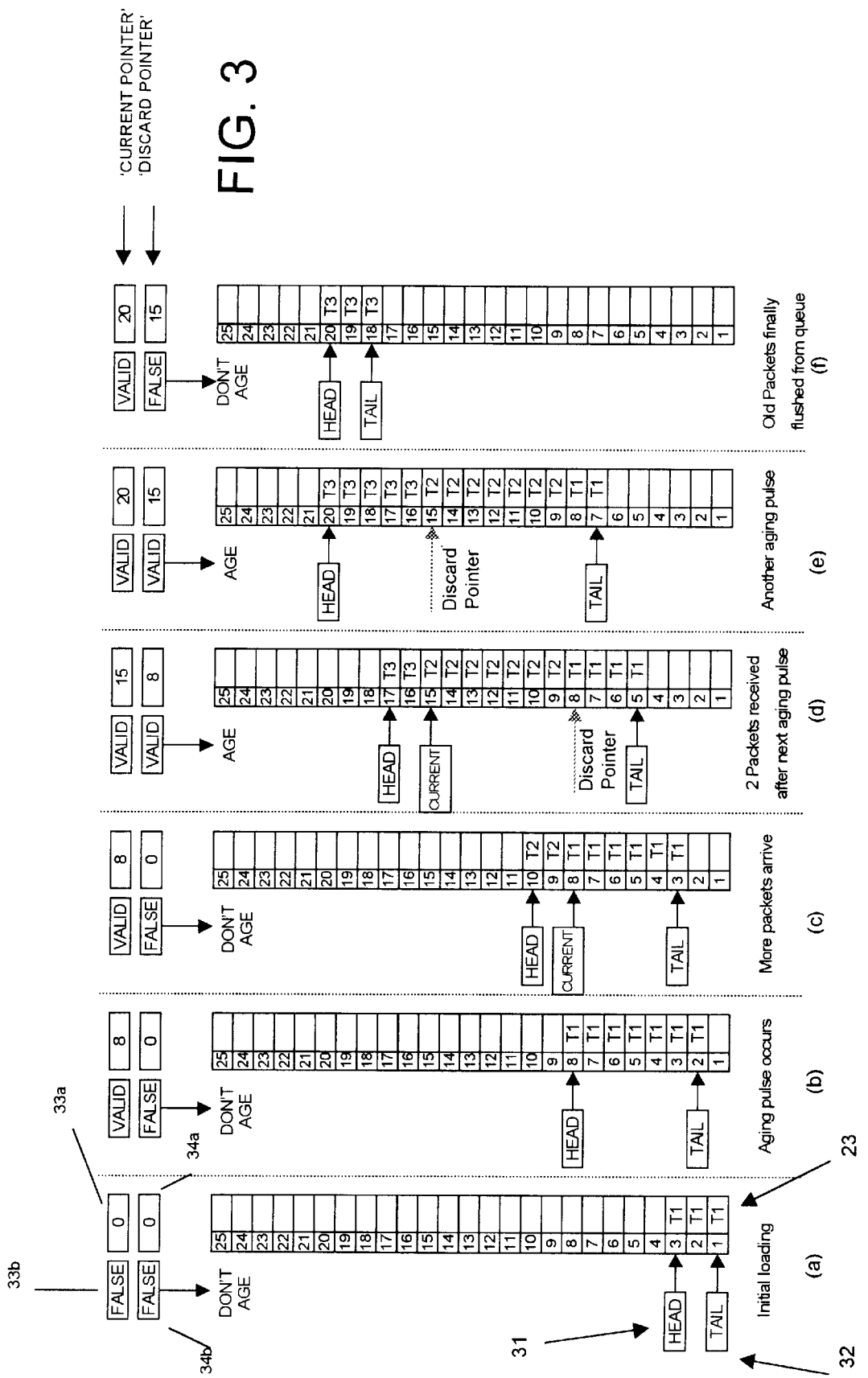
FIG. 3 illustrates various phases of a method/system of an exemplary embodiment of the present invention.

In one form of buffer to which the invention is applicable, the two principal pointers are a head pointer and a tail pointer. The head pointer defines the location where the writing of a packet should commence and the tail defines where the reading of a packet should commence. Thus, as shown in FIG. 3(*a*), a head pointer 31 is pointing to location 3 and defines thereby the next location (location 4) at which the writing of the next packet to be stored in the queue will commence. The tail pointer 32 points to location 1 and defines the place where the next reading cycle will be performed.

If as assumed herein the FIFO is implemented in static random access memory, it may be allotted a fixed space and both the head and tail pointers may move through this space and recycle when they reach the limit of it. If the head pointer catches up with the tail pointer, the allotted memory space is completely full whereas if the tail pointer catches up with the head pointer, the memory space is empty. The pointers 31 and 32 are stored in pointer control 24 in registers 31*a* and 32*a* respectively and each have a respective one-bit validity flag 31*b* and 32*b*. These are shown separately from the associated register for convenience.

However, this is not the only way of organising a FIFO queue. In particular, the available memory space may be constituted by a large number of addressable buffers which are not in general specifically allotted to any particular queue until they are used. A pointer queue can be defined in a similar way and when a queue desires more memory space for fresh packets in the queue, it is allotted to that queue by means of a free pool controller. In principle however the operation of the present invention will be the same, since the invention relates to the use of pointers to identify and delimit a traffic queue and is not dependent upon any particular physical implementation of the memory space or the pointers.

As previously indicated, it is customary in systems of this nature to stamp or frank a packet when it enters the switch, i.e. when it enters a receive queue, with a system age. A system age may be generated by a counter which increments at some selective interval of time, which may be very short (measured in milliseconds) or may be substantially longer. The counter may therefore provide an n-bit number representing the system age and that n-bit number at the time the packet entered the switch is inserted in an "age" field in the header portion or status word portion of a packet. When a packet is ready for transmission, reading of the age and a comparison of the stamped age with the actual system age may be used to discard a packet which is too old. As previously indicated, since the space available in an age field of a packet is necessarily limited, it is necessary to limit the number of bits and in practical systems the system age represented by the counter recycles.

The present invention is based on a different method of determining whether a packet has aged sufficiently to warrant its discard. The preferred manner in which the invention may be performed is illustrated in the various phases shown in FIG. 3.

FIG. 3(*a*) shows, as do the other parts of FIG. 3, the memory space 23 with memory locations numbered from 1 to 25, a head pointer 31 and a tail pointer 32. It also shows above each memory space two registers 32*a* and 34*b* (also shown in FIG. 2) and two respective flags 33*b* and 34*b*. The register 33*a* holds the pointer called herein the 'current' pointer, flag 33*b* indicating whether the pointer is valid or false. The register 34*a* holds the pointer called herein the 'discard' pointer and its flag 34*b* indicates whether the pointer is valid or false. The pointers in register 33*a* and 34*b* and their flags are changed only when an ageing pulse occurs i.e. the system age changed from one basic period to the next. Initially as shown at the top of FIG. 3(*a*), both the current pointer and the discard pointer are zero and 'false'.

FIG. 3(*a*) illustrates an initial condition wherein during a system interval T1 packets have been loaded into the FIFO by means of the head pointer 31 which is currently pointing at location 3, indicating that the next writing of packets into the FIFO will commence at location 4. The memory spaces in this example indicate whole packets; the designation 'T1' in memory spaces 1–3 indicates that all the packets shown in FIG. 3(a) have been loaded into the FIFO during the same time interval.

FIG. 3(b) shows the status at the end of time period T1. More packets have been loaded into the FIFO, the head pointer pointing at location 8, and a packet has been read out of the space indicated memory location 1 under the control of the tail pointer. At this point an ageing pulse occurs so that the queue head pointer is stored as a current pointer and its (FALSE) 'valid' flag is set. At the same time, the previous value (0) of the current pointer and its flag are stored as the discard pointer and its flag respectively. FIG. 3(c) illustrates an intermediate time during interval T2. The discard pointer has not yet changed, although the current pointer has (and points to location 8). Additional packets have arrived and are stored in locations 9 and 10 and additional packets have been removed, the tail pointer having moved up to location 3.

FIG. 3(d) shows the conditions during interval T3. At the end of interval T2 the head pointer was at location 15 and two further packets have been received since the ageing pulse at the end of that interval. Thus the 'current' pointer would point at location 15 and is valid and the discard pointer indicating the discard level is at location 8 because that was the location of the head pointer at the previous ageing pulse. Since the previous value of the 'current' flag was valid, the value of the 'discard' flag is valid and so the discard pointer is generated and is shown pointing at location 8 in FIG. 3(d). Those packets which are in the queue between the 'discard' pointer and the 'tail' pointer indicates all the packets that have been in the queue for longer than two age intervals, namely intervals delimited by two ageing pulses, and may now be regarded as 'stale'.

In the absence of the discard pointer, packets would be forwarded to their destinations as the tail pointer moved up the queue. Now, however there is a mechanism for discarding packets which are 'stale' i.e. the flag of the discard pointer being valid and the head pointer being at a location which is 'lower' or 'older' than that of the discard pointer.

The above process occurs on every ageing pulse and thus the discard pointer moves up the queue. Even if data cannot be temporarily removed from the queue, the amount of data to be aged will just grow. As ageing occurs from the value in the discard register to the tail pointer, no matter how many age intervals occur, it is impossible for the stale data to become valid again.

If at any time the value of the tail pointer equals that of the discard pointer, there are no more packets in the queue that need discarding and the associated valid flag can be cleared (i.e. set to false as shown in FIG. 3(f)). If the tail pointer reaches the current pointer then the latter's valid flag can also be cleared because no packets for the respective time interval are present in the queue.

It will be seen that the 'current' pointer need not be applied to the memory space and is therefore merely a means of preserving an immediately previous value of the head pointer for an age interval, whereby the discard pointer can assume the value of the head pointer as it was two age intervals before.

What is claimed is:

1. A packet memory system including a memory space having a multiplicity of addressable memory locations for the storage of data packets and pointer control means for generating a write pointer which progressively defines where data is to be written to the memory space and a read pointer which progressively defines where data is to be read from the memory space and an ageing clock which defines a succession of intervals, wherein said pointer control means further generates a discard pointer and for each interval is operative to cause the discard pointer to correspond to a previously stored value of the write pointer whereby the portion of the memory space between the discard pointer and the read pointer denotes data which has been in said memory space for at least two of said intervals.

2. A packet memory system including a memory space having a multiplicity of addressable memory locations for the storage of data packets and pointer control means for generating a write pointer which progressively defines where data is to be written to the memory space and a read pointer which progressively defines where data is to be read from the memory space and an ageing clock which defines a succession of intervals, wherein said pointer control means further generates a current pointer and a discard pointer and for each interval is operative to cause the current pointer to correspond to an immediately previous value of the write pointer and to cause the discard pointer to correspond to an immediately previous value of the said current pointer whereby the portion of the memory space between the discard pointer and the read pointer denotes data which has been in said memory space for at least two of said intervals.

3. A packet network device including:
   a multiplicity of ports for the reception and/or forwarding of data packets;
   a memory space associated with at least one of said ports, said memory space having a multiplicity of addressable memory locations for the storage of data packets;
   pointer control means for generating a write pointer which progressively defines where data is to be written to said memory space and a read pointer which progressively defines where data is to be read from the memory space; and
   an ageing clock which defines a succession of intervals;
   wherein said pointer control means further generates a current pointer and a discard pointer and for each interval is operative to cause the current pointer to correspond to an immediately previous value of the write pointer and to cause the discard pointer to correspond to an immediately previous value of the said current pointer whereby the portion of the memory space between the discard pointer and the read pointer denotes data which has been in said memory space for at least two of said intervals.

4. A packet network device including:
   a multiplicity of ports for the reception and/or forwarding of data packets;
   a memory space associated with at least one of said ports, said memory space having a multiplicity of addressable memory locations for the storage of data entries representing data packets;
   pointer control means for generating a write pointer which progressively defines where data is to be written to said memory space and a read pointer which progressively defines where data is to be read from the memory space; and
   an ageing clock which defines a succession of intervals;
   wherein said pointer control means is operative:
   (a) to store the value of said write pointer at the end of one of said intervals; and
   (b) to generate a discard pointer and at the end of an interval subsequent to the end of said one of the intervals to cause the discard pointer to correspond to the stored value of said write pointer, whereby the portion of the memory space between the discard pointer and the read pointer denotes data which has been in said memory space for more than one of said intervals.

5. A packet network device according to claim 4 wherein said pointer control means stores said value as a current pointer and causes said discard pointer in one of said intervals to assume the value of the current pointer during a previous one of said intervals.

6. A packet memory system of claim 1 wherein the discard pointer corresponds to the value of the write pointer stored at the end of a previous interval.

7. A packet memory system of claim 2 wherein the discard pointer corresponds to the value of the write pointer stored at the end of a previous interval.

8. A packet memory system of claim 3 wherein the discard pointer corresponds to the value of the write pointer stored at the end of a previous interval.

9. A method comprising:

providing a memory space having a multiplicity of addressable memory locations for the storage of data packets;

generating a write pointer which progressively defines where data is to be written to the memory space and a read pointer which progressively defines where data is to be read from the memory space;

defining a succession of intervals with an ageing clock; and generating a discard pointer and for each interval causing the discard pointer to correspond to a previously stored value of the write pointer whereby the portion of the memory space between the discard pointer and the read pointer denotes data which has been in said memory space for at least two of said intervals.

10. A method comprising:

providing a memory space having a multiplicity of addressable memory locations for the storage of data packets;

generating a write pointer which progressively defines where data is to be written to the memory space and a read pointer which progressively defines where data is to be read from the memory space;

defining a succession of intervals utilizing an ageing clock; and generating a current pointer and a discard pointer and for each interval causing the current pointer to correspond to an immediately previous value of the write pointer and causing the discard pointer to correspond to an immediately previous value of the said current pointer whereby the portion of the memory space between the discard pointer and the read pointer denotes data which has been in said memory space for at least two of said intervals.

11. A method comprising:

providing a memory space associated with at least one of port for receiving and/or forwarding data packets, said memory space having a multiplicity of addressable memory locations for storage of data packets;

generating a write pointer which progressively defines where data is to be written to said memory space and a read pointer which progressively defines where data is to be read from the memory space;

defining a succession of intervals with an ageing clock; and generating a current pointer and a discard pointer and for each interval causing the current pointer to correspond to an immediately previous value of the write pointer and causing the discard pointer to correspond to an immediately previous value of the said current pointer whereby the portion of the memory space between the discard pointer and the read pointer denotes data which has been in said memory space for at least two of said intervals.

12. A method of claim 9, wherein the discard pointer corresponds to the value of the write pointer stored at the end of a previous interval.

13. A method of claim 10, wherein the discard pointer corresponds to the value of the write pointer stored at the end of a previous interval.

14. A method of claim 11, wherein the discard pointer corresponds to the value of the write pointer stored at the end of a previous interval.

* * * * *